United States Patent [19]

Anderholm

[11] Patent Number: 4,757,653
[45] Date of Patent: Jul. 19, 1988

[54] STAIR BRACKET SYSTEM

[76] Inventor: Grant Anderholm, 441 Mountain View Ave., Santa Rosa, Calif. 95407

[21] Appl. No.: 6,116

[22] Filed: Jan. 23, 1987

[51] Int. Cl.$^4$ ............................................. E04F 11/00
[52] U.S. Cl. ..................................... 52/182; 52/184; 403/199; 403/232.1
[58] Field of Search .................. 52/182, 183, 184, 191; 403/199, 232.1, 398, 399; 182/93, 228

[56] References Cited

U.S. PATENT DOCUMENTS

| | | | |
|---|---|---|---|
| D.159,627 | 2/1975 | Argerbright | 182/228 |
| 1,258,332 | 3/1918 | Hampton | 182/228 |
| 1,961,781 | 6/1934 | Reagle | 182/228 |
| 2,425,025 | 8/1947 | Boisselier | 182/228 |
| 4,015,687 | 4/1977 | Dean | 52/182 |
| 4,144,683 | 3/1979 | Dean | 182/93 |
| 4,593,503 | 6/1986 | Koslowski | 52/183 |

FOREIGN PATENT DOCUMENTS

| | | | |
|---|---|---|---|
| 61199 | 4/1975 | Australia | 52/126.7 |
| 2390564 | 1/1979 | France | 52/182 |
| 2467937 | 10/1979 | France | 52/182 |

*Primary Examiner*—Henry E. Raduazo
*Attorney, Agent, or Firm*—Larry D. Johnson

[57] ABSTRACT

An apparatus and method for the construction of stairs provides a series of specially-designed brackets to enable the builder to screw or bolt the steps to the inside surface of the stringers, thereby obviating the need to notch the stringers, and avoiding undesirable wood-to-wood contact. In addition, such bolting is considerably more efficient than traditional nailing, and allows easy access to and replacement of the steps and/or hardware when necessary. Furthermore, this bolting and bracket method enables the use of precalculated dimensional instructions for proper location of the brackets on the stringers, and thus is especially conducive to the modular construction and prefabrication of stairs.

6 Claims, 1 Drawing Sheet

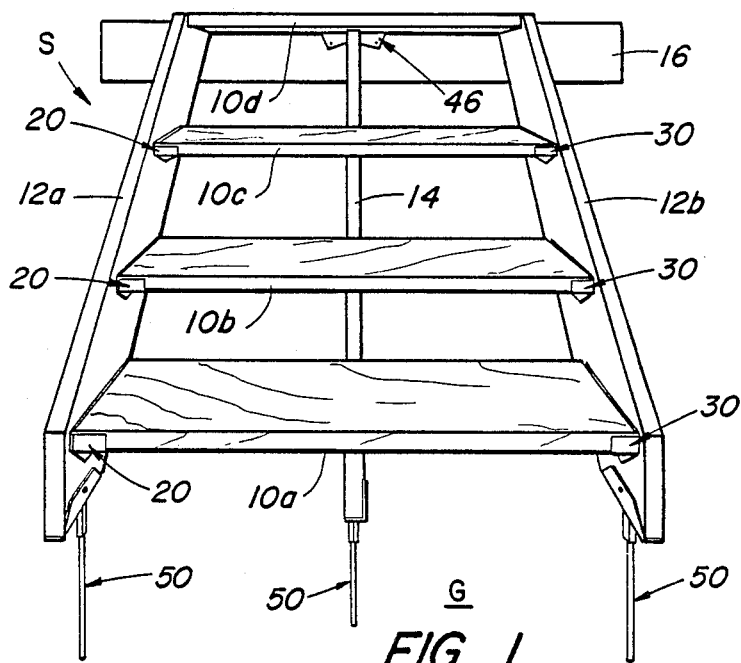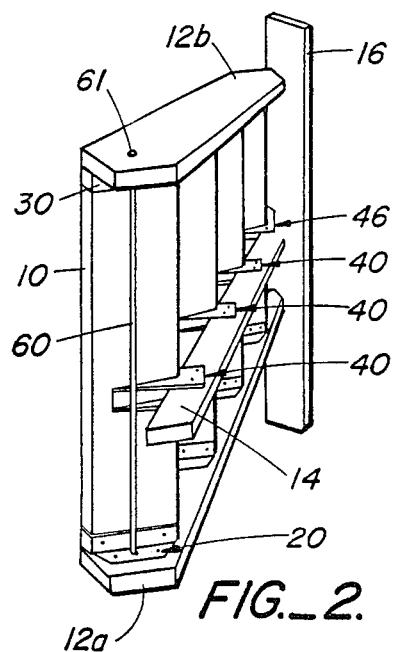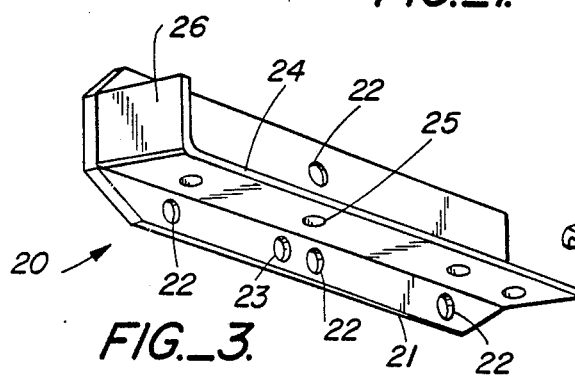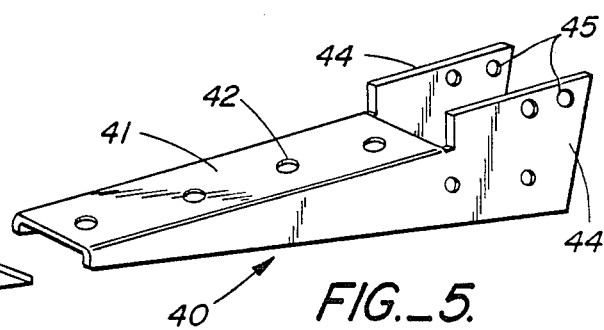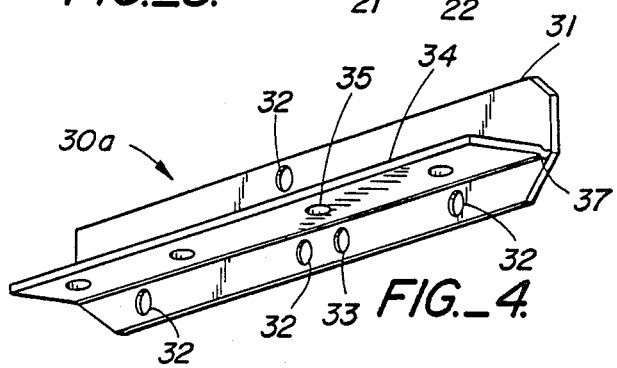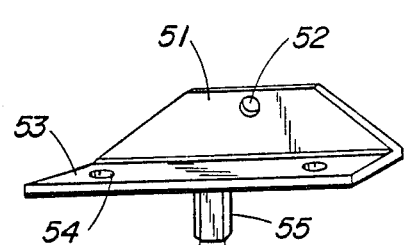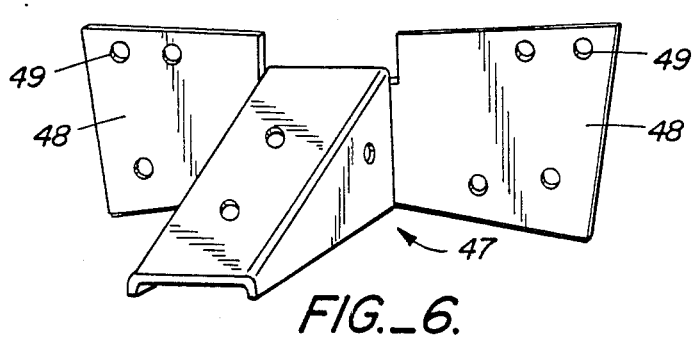

1

STAIR BRACKET SYSTEM

BACKGROUND OF THE INVENTION

1. Field of the Invention

This invention relates generally to building and construction materials, and more specifically to hardware for and methods of stair construction.

2. Description of the Prior Art

The design and construction of stairs for residential and commercial buildings is often a difficult, time-consuming task. Typically, stair construction involves the measuring, cutting, notching, and installation of the beams or stringers used to support the steps or stairs, followed by the nailing of the steps to those notched stringers. Unfortunately, this common method of stair construction presents many problems. For example, it is often difficult to properly determine the measurements necessary to place the cuts for the notches, and then to accurately make those cuts. In addition, the stringers tend to split or crack where they are notched, are structurally weakened by that notching, and are prone to dry rot there. Also, the steps themselves tend to crack and split where nailed, and tend to work themselves loose with time, causing step slippage and creaking when they are used. Furthermore, the wood-to-wood contact of the steps to the stringers tends to promote dry rot problems, causes swelling from changes in temperature and humidity, permits any water that might fall there to remain and cause further problems, and causes the securing nails to pull loose. Still further, since stairs constructed in this manner need periodic maintenance and/or replacement to remedy these problems, the high cost of such construction tends to be repeated and prolonged. Finally, this inefficient method of construction is not conducive to the prefabrication or modular construction of stairs.

SUMMARY OF THE INVENTION

The stair bracket system of this invention provides a superior apparatus and method for the construction of stairs. A series of specially-designed brackets enable the builder to screw or bolt the steps to the inside surface of the stringers, thereby obviating the need to notch the stringers, and avoiding undesirable wood-to-wood contact. In addition, such bolting is considerably more efficient than traditional nailing, and allows easy access to and replacement of the steps and/or brackets when necessary. Furthermore, this bracket and bolting method is especially conducive to the modular construction and prefabrication of stairs.

The bracket system itself comprises a series of five bracket types, plus their variations and mounting hardware. First, a pair of left and right-hand stair shoe brackets are used to support each individual step, and bolt that step to the inside surface of both stringers. The stair shoes include a horizontal support piece with screw holes for screw or bolt attachment to the underside of the step, and a vertical plate piece which itself has screw holes for such screw or bolt attachment to the respective stringers. The stair shoes may include a front and/or rear lip for further fore-and-aft stabilization of the steps, or may be designed without such a lip to enable extrusion manufacture of the stair shoe. The stair shoes incorporate a gutter or drip channel at the support/plate junction to help eliminate any standing water. In addition, these stair shoes may accomodate a stringer-to-stringer seismic rod that passes through both stringers and both brackets beneath the step, which enhances the lateral support of each step and the overall stair system, and further enables ease in manufacture and shipping for prefabricated stairs.

Next, a series of center horse brackets provide central support and stability to the steps, and have particular application with wide steps (over 36"). These horse brackets support the steps on a center stringer, thereby preventing sag or shifting of the steps. They include a horizontal support piece with screw holes for screw or bolt attachment to the underside of the step, and a pair of vertical plate pieces with screw holes for screw or bolt attachment to the center stringer. A modified center horse bracket is used to secure the topmost step to the building or facia, and incorporates perpendicularly flared vertical plate pieces with screw holes for screw or bolt attachment to the building.

Finally, a bottom stair bracket is used with exterior stairs, and supports the left and right stringers (and center stringer, if any) on a receiver engaged to a threaded rod, thereby enabling adjustment of the height of the stringer from the ground or other surface. The bottom stair bracket includes a horizontal support piece for placement beneath the stringer, and a vertical plate piece for placement next to the stringer, each with screw holes for screw or bolt attachment to the stringer.

The use of these brackets enables the builder to design and construct stairs by proper placement of the necessary brackets on the stringers. Thus, by predetermined location of the screw holes within the brackets, and determination of the size of the stringer and tread materials to be used, a set of trigonometrically-calculated measurement instructions can be provided to the builder to enable him to accurately install the brackets by simply measuring and marking the stringers. Thus, the ability to prefabricate stairs is greatly simplified and enhanced.

BRIEF DESCRIPTION OF THE DRAWINGS

FIG. 1 is a perspective view of a four-step exterior stairway construction with the stair bracket system of this invention;

FIG. 2 is a perspective view of a four-step interior stairway (lying on it's left side) constructed with the stair bracket system of this invention;

FIG. 3 is a perspective view of a left stair shoe bracket of this invention;

FIG. 4 is a perspective view of an extruded version of a right stair shoe bracket of this invention;

FIG. 5 is a perspective view of a center horse bracket of this invention;

FIG. 6 is a perspective view of a stop stair center horse bracket of this invention; and FIG. 7 is a perspective view of an adjustable bottom stair bracket of this invention.

DETAILED DESCRIPTION OF A PREFERRED EMBODIMENT

FIG. 1 is a perspective view of a typical exterior stairway that could be constructed with the stair bracket system of this invention. The stairway S includes four treads or stairs 10a, b, c, and d, carried between a left beam or stringer 12a and a right beam or stringer 12b. A center stringer 14 is used when the steps used are relatively wide, say greater than three feet, and provides central support and rigidity to the stairway.

This stairway is designed to extend from ground G to a facia 16 of a building.

A series of left stair shoe brackets 20 and right stair shoe brackets 30 each support an individual stair 10 and secure it, by bolting or screwing, to left stringer 12a and right stringer 12b, respectively. A top stair center horse bracket 46 is seen in this pespective securing the top step 10d to center stringer 14, and both of those to facia 16. A series of adjustable bottom stair brackets 50 support the left, center, and right stringers from the ground, and can be emplaced in concrete or other suitable foundation material.

The stair shoe brackets, as well as the other brackets of this invention, are preferably made of 5052 grade aluminum, galvanized steel, or similar material. Of course, particular applications may require the use of specific materials, such as stainless steel. The brackets and their mounting hardware are thus readily manufactured using existing methods, and should be universally acceptable in modern building techniques and codes.

Referring now to FIG. 2 with greater particularity, a typical indoor-type stairway is illustrated as having been premanufactured, and laying on it's left side. In this view, steps 10 are again seen carried between the left and right-hand stringers 12a and 12b, and supported by center stringer 14. Here, a series of center horse brackets 40 bolt or screw to the center stringer, and to the respective step they support. The stop stair center horse bracket 46 again serves to secure the top step, center stringer, and building facia 16 together.

A threaded seismic rod 60 is shown extending between the two stringers 12a and 12b beneath the lowermost step 10, passing through the stair shoe brackets 20 and 30 and their respective stringers, and bolting to the outside of the stringers, e.g. at bolt 61. The installation of these seismic rods is optional, but it has been determined that incorporation of such rods greatly enhances the overall structural integrity of the stairway, so use of such rods at least every other step is recommended. In addition, use of these rods is desirable in the construction and transportation of pre-manufactured, modular-type stairways, because of the added rigidity and strength they give to the stairway system.

FIG. 3 illustrates a perspective view of a left stair shoe bracket 20, comprising a vertical plate 21 bearing screw holes 22 for bolting to the respective stringer, and a seismic rod hole 23, which could alternatively be used as yet another screw hole. A horizontal support piece 24 includes screw holes 25 for bolting to the respective step, and a front lip 26, which provides a forward stop to the step. Alternatively, a rear lip could be included instead of or in addition to such front lip, thereby fully capturing the step placed thereon.

FIG. 4 illustrates a alternative embodiment of a stair shoe bracket. Here, right stair shoe bracket 30a incorporates most of the features of left stair shoe bracket 20 (FIG. 3), including a vertical plate 31 bearing screw holes 32 and seismic rod hole 33, and a horizontal support piece 34 bearing screw holes 35. However, bracket 30a does not include a front (or rear) lip, enabling the design of this bracket to be more readily manufactured by typical extrusion methods. This view also illustrates a drip gutter 37 at the juncture of plate 31 and support 34, which gutter serves to gather and eliminate any standing water that might fall on or leak to the steps.

FIG. 5 is a view of a center horse bracket 40, including a horizontal support surface 41 bearing screw holes 42 for bolting to a step, and a pair of vertical flanges 44 bearing screw holes 45 for bolting to a stringer.

FIG. 6 is a view of a top stair center horse bracket 47, which is a modified version of center horse bracket 40 (FIG. 5). Here, the vertical flanges 48 have been flared ninety degrees so that they may be secured squarely to a building or other vertical face, and include screw holes 49 for bolting to that face.

FIG. 7 illustrates an adjustable bottom stair bracket 50, including a vertical plate 51 bearing a screw hole 52 for bolting to a stringer, and a horizontal support piece 53 bearing screw holes 54 for supporting such stringer. The support 53 is welded for otherwise connected to a receiver 55, which accepts and threads on to a threaded rod 56. This arrangement enables rod 56 to be cemented, bolted, or otherwise secured to the ground, and allows reciever 55, and therefore support 53, to be adjusted in height above it.

In addition to constructing a structurally superior stairway, the above-described brackets enable the user to design and build stairs in a simple, efficient manner. The location of the screw holes in the brackets are predetermined to accomodate proper positioning of, and threading of the screw or bolt into, standard thread materials. Therefore, depending on the particular rise and run dimensions necessary for the stairway (which will determine the number of steps required), and the material size selected for the steps, a simple table or chart can be designed and consulted to define the proper placement of the left and right stair shoe brackets on the inside surface of their respective stringers. For example, the following method of measurement and placement would be used for a stairway having steps with a 7" rise and a 9½" tread, on a 2"×10" (or 2"×12") stringer. First, a single horizontal line is drawn across the width of the inside surface of the stringer, where the first step is to be placed. Next, a perpendicular to that line is drawn 3¼" ("front set") from the front edge of the stringer, and the intersection with the horizontal line previously drawn defines the location of the front set screw for the stair shoe bracket. Next, another perpendicular to the horizontal line is drawn 6⅛" ("rear set") from the front edge of the stringer, and an offset of 1 9/16" ("rear offset") is measured from that intersection (to the left for the left hand stringer, or to the right for the right hand stringer), which defines the location of the rear set screw for that bracket. This method of set screw placement trigonometrically defines the placement of the shoe bracket for that step. The placement of the next, successively higher bracket and step ("next bracket") can then be determined by simply measuring 11 11/16" above each of those determined set screw points, and so on. For different rise and/or tread measurements, the following table defines the necessary adjustments (all measurements are in inches):

| Rise | Tread | Front Set | Rear Set | Rear Offset | Next Bracket |
|---|---|---|---|---|---|
| 7 | 9½ | 3⅛ | 6⅛ | 1 9/16 | 11 11/16 |
| 7¼ | 9½ | 3¼ | 6 3/16 | 1 7/16 | 11⅞ |
| 7¼ | 9½ | 3 5/16 | 6 3/16 | 1½ | 11⅞ |
| 7⅜ | 9½ | 3 5/16 | 6¼ | 1½ | 12 |
| 7½ | 9½ | 3 5/16 | 6¼ | 1½ | 12 1/16 |
| 7⅝ | 9½ | 3⅜ | 6 5/16 | 1 7/16 | 12⅛ |
| 7 | 11⅜ | 3 | 5¾ | 1 13/16 | 13 7/16 |
| 7¼ | 11⅜ | 3 1/16 | 5 13/16 | 1 13/16 | 13½ |
| 7⅜ | 11⅜ | 3 1/16 | 5 13/16 | 1 13/16 | 13 9/16 |
| 7⅜ | 11⅜ | 3 1/16 | 5⅞ | 1¾ | 13⅝ |
| 7½ | 11⅜ | 3⅛ | 5 15/16 | 1¾ | 13 11/16 |

| Rise | Tread | Front Set | Rear Set | Rear Offset | Next Bracket |
|---|---|---|---|---|---|
| 7⅜ | 11⅜ | 3½ | 5 15/16 | 1 11/16 | 13¾ |

The steps can then be simply bolted into place, followed by the attachment of the center stringer and center horse bracket (if necessary), and the bottom stair brackets (if necessary), and the constructed stairway will be ready for installation. Alternatively, the stair bracket system can be used with conventional framing square construction techniques.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only the appended claims.

What is claimed as invention is:

1. A stair bracket system for a stairway having a left, center, and right stringer, said left and right stringer each having an inside surface, and at least one step having a left and right side for attachment to said stringers, comprising:
   a left stair shoe bracket having a horizontal support portion for removable attachment to the left side of said step, and a vertical plate portion for removable attachment to the inside surface of said left stringer;
   a right stair shoe bracket having a horizontal support portion for removable attachment to the right side of said step, and a vertical plate portion for removable attachment to the inside surface of said right stringer; and
   a center horse bracket having a horizontal support portion for removable attachment to said step, and a vertical plate portion for removable attachment to said center stringer, wherein when said step is attached to said brackets, and said brackets are attached to said stringers, said step is captured between but does not itself physically contact said left and right stringers, and is supported by but does not physically contact said center stringer.

2. The stair bracket system of claim 1 including a top stair center horse bracket having a horizontal support portion for removable attachment to said step, a vertical plate portion for removable attachment to said center stringer, and a flanged vertical plate portion for removable attachment to a building surface.

3. The stair bracket system of claim 1 including a bottom stair bracket having a horizontal support portion for removable attachment to a stringer, a vertical plate portion for removable attachment to said same stringer, and adjustment means for selectively varying the height of said support portion.

4. The stair bracket system of claim 1 wherein said left and right stair shoe brackets each include a lip portion for engagement of said step.

5. The stair bracket system of claim 1 wherein said left and right stair shoe brackets each include a gutter portion between said horizontal support portion and said vertical plate portion.

6. The stair bracket system of claim 1 including a rod portion passing through said left and right stair shoe brackets, and connecting said left and right stringers.

* * * * *